No. 732,906. PATENTED JULY 7, 1903.
C. P. STEINMETZ.
DYNAMO ELECTRIC MACHINE.
APPLICATION FILED APR. 9, 1900.
NO MODEL. 2 SHEETS—SHEET 1.

Witnesses.
Edward Williams, Jr.
Benjamin B. Hull

Inventor:
Charles P. Steinmetz
by Albert G. Davis
Atty.

No. 732,906. PATENTED JULY 7, 1903.
C. P. STEINMETZ.
DYNAMO ELECTRIC MACHINE.
APPLICATION FILED APR. 9, 1900.
NO MODEL. 2 SHEETS—SHEET 2.
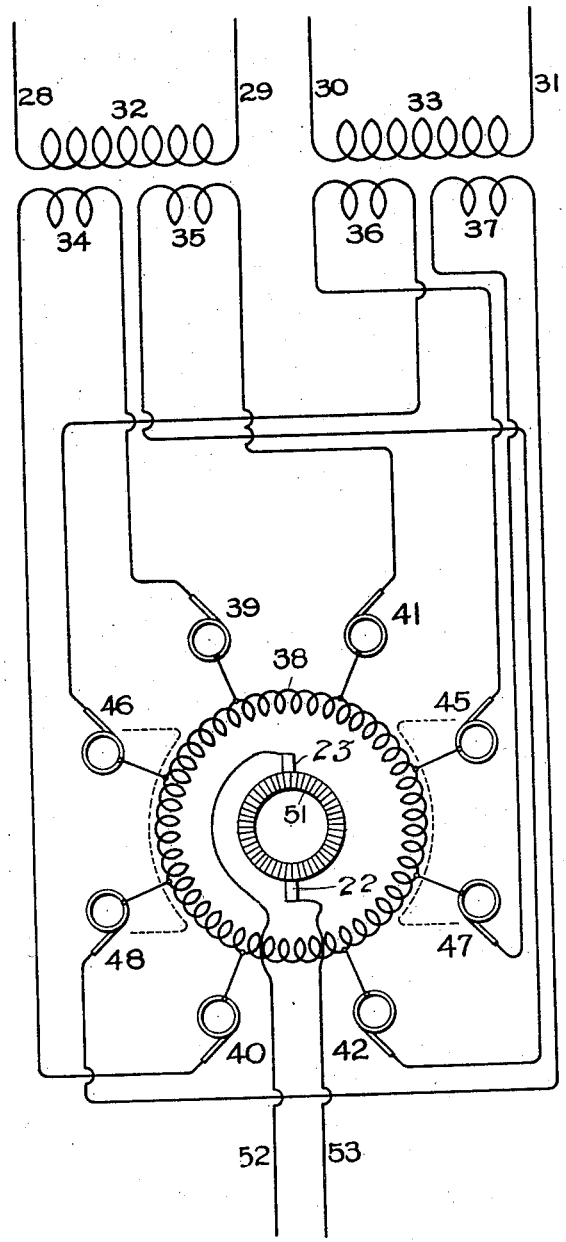
Fig. 3.
Fig. 4.
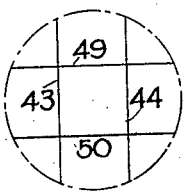
Witnesses:
Lewis E. Abell.
Benjamin B. Hull.
Inventor.
Charles P. Steinmetz,
by Albert G. Davis.
Atty No. 732,906. Patented July 7, 1903.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

DYNAMO-ELECTRIC MACHINE.

SPECIFICATION forming part of Letters Patent No. 732,906, dated July 7, 1903.

Application filed April 9, 1900. Serial No. 12,159. (No model.)

*To all whom it may concern:*

Be it known that I, CHARLES P. STEINMETZ, a citizen of the United States, residing at Schenectady, county of Schenectady, State of New York, have invented certain new and useful Improvements in Dynamo-Electric Machines, of which the following is a specification.

Generally speaking, my present invention relates to certain improvements in dynamo-electric machines whereby the heating of the conductors is reduced, certain other losses partially eliminated, and the output of the machine as a whole increased.

The invention is particularly useful in connection with rotary converters and is equally valuable whether the converter be used for changing alternating current into direct current or the reverse. It is to be understood, however, that although the invention is especially desirable in connection with rotary converters it is not to be considered as limited thereto, but rather as embodying such applications of the same as are included within the terms of the claims appended hereto.

Briefly characterized, my invention includes the idea of a dynamo-electric machine having connected thereto a plurality of sets of leads which in normal operation carry currents of substantially the same phase.

A more complete understanding of the organization and mode of operation of my invention, together with the advantages accompanying the use of the same, will be had by reference to the following description, taken in connection with the accompanying drawings, in which—

Figure 1:
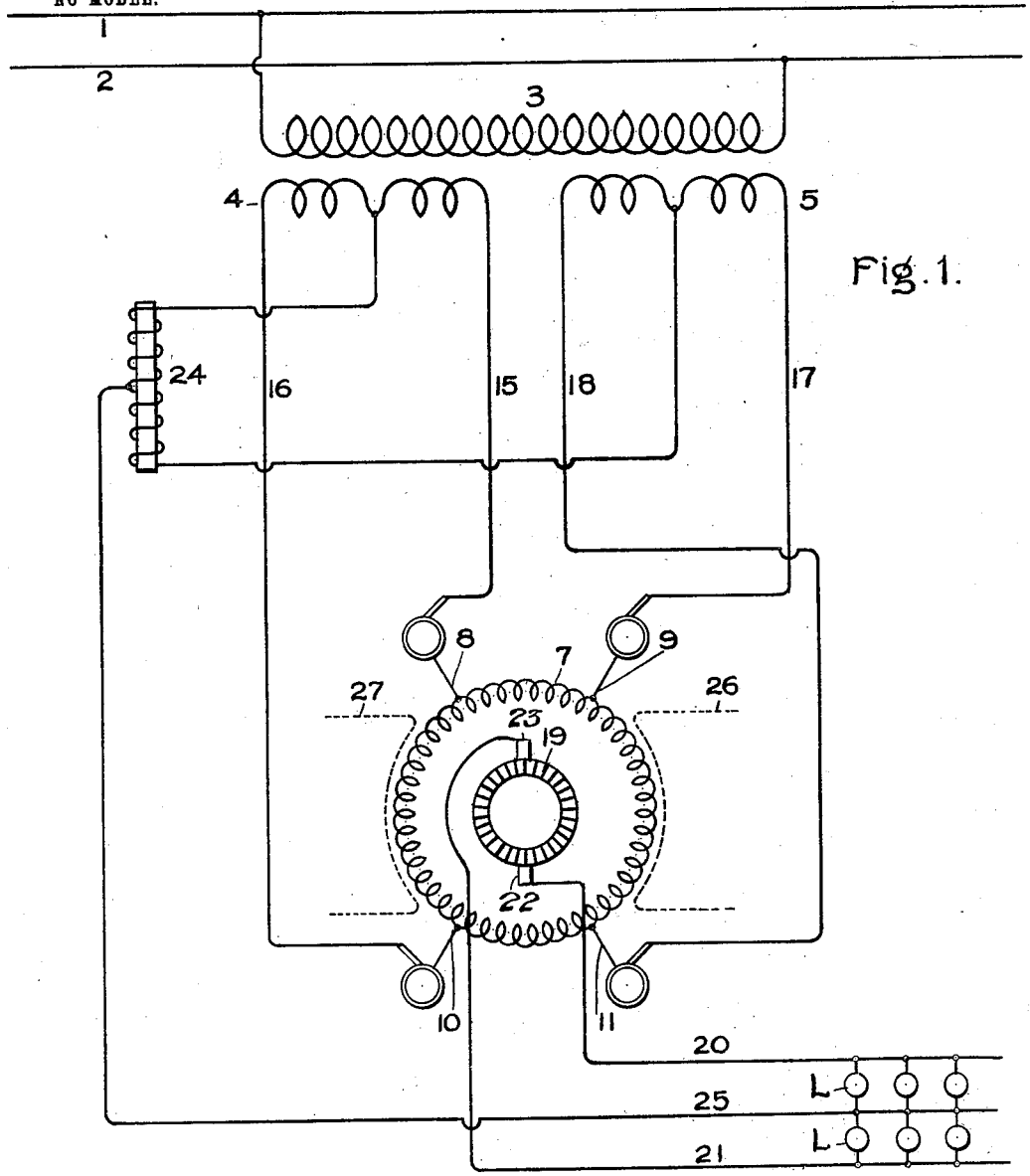
Figure 2:
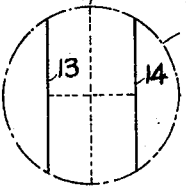

Figure 1 shows the application of the invention to a single-phase alternating-current system, Fig. 2 being a diagram explanatory of the same. Fig. 3 shows the invention as embodied in a multiphase system of distribution, Fig. 4 being a similar explanatory diagram.

The application of the invention as illustrated in Figs. 1 and 2 of the drawings comprises a system in which single-phase alternating current is supplied to a rotary converter, by which it is changed into direct current. Single-phase supply-mains are shown at 1 2, and from these mains branches are tapped off leading to the primary winding 3 of a transformer the secondary of which is divided into two sections, (numbered 4 and 5, respectively.) Leads extend from the secondaries 4 5 and are connected to the armature-winding of a rotary converter, (shown in the drawings diagrammatically at 7.) In the arrangement shown, the armature-winding 7 is provided with four taps 8, 9, 10, and 11, leading to adjacent collector-rings. It is not essential in order to obtain the beneficial effects of my invention that these taps should be connected to the armature-winding of the converter in a precise manner, since considerable latitude is permissible in making these connections, as will presently be seen.

In the arrangement shown in Fig. 1 the taps 8 10 are connected to the armature-winding 7 at points displaced from each other by one-third of the polar pitch, which in bipolar machines represents an arc of one hundred and twenty degrees. The corresponding taps 9 and 11 are likewise connected to the armature-winding 7 at points displaced from each other by the same arc. It is to be noted that the chords of these two arcs are arranged so as to lie parallel to the same diameter, (represented by the dotted line 12 in Fig. 2,) by reason of which arrangement the induced electromotive force between one set of taps will be in the same phase as that between the other set of taps. This relation of electromotive forces is shown diagrammatically in Fig. 2, in which the dotted inscribing-circle 120 denotes the locus of electromotive forces about the various points in the armature-winding 7, while the parallel lines 13 and 14 represent, respectively, the electromotive forces generated between or impressed upon the two sets of taps 8 10 and 9 11, respectively.

The taps 8 10 are connected to leads 15 16, extending from the secondary 4, while the taps 9 11 are similarly connected to leads 17 18, extending from the secondary 5. The secondaries 4 and 5, being inductively related to the same primary, therefore generate currents of the same phase, which, being led to respective sets of collector-rings, are then fed into the armature-winding 7, creating therein magnetomotive forces which coöperate to the extent that they are in the same phase with each other, but which at the same time are to a certain extent distinct in that they are produced by currents fed into the armature-winding through separate circuits. A resultant magnetization is, however, given to the armature similar to that which would exist if a single-phase current were fed into the armature at points diametrically opposite from each other, with the distinction, however, that in the two cases the distribution of currents in the armature-winding is different.

The rotary converter is provided with a commutator 19 of ordinary form, suitably connected in the ordinary manner to points in the armature-winding 7. To prevent confusion in the drawings, these connections between the commutator-segments and the armature-winding have been omitted; but the construction, being so common, will be readily understood without the aid of illustration. Direct-current mains 20 and 21 are connected to commutator-brushes 22 and 23, bearing on the commutator 19, and supply current to translating devices of any appropriate character—such, for example, as lamps L.

A feature somewhat incidental to the invention thus described may be employed in connection therewith for the purpose of obtaining a neutral conductor to be used in connection with the direct-current mains 20 and 21 to form therewith a three-wire direct-current system. To secure such a neutral conductor, an inductance-coil of appropriate capacity is connected between the middle points, respectively, of the secondary windings 4 and 5. This corresponds to connecting the middle points in the lines 13 14, representing the electromotive forces of the secondaries 4 and 5. The straight horizontal dotted line in Fig. 2 illustrates the connection between the middle points of the electromotive-force lines 13 and 14, and it will be noted that this line passes through the center of the inscribing-circle. The center of the dotted line being then the center of the inscribing-circle, which represents the electromotive forces existing throughout the armature-winding 7, therefore corresponds to a point of neutral potential with respect to these electromotive forces. If a conductor be led from the middle point in the length of the inductance-coil 24, connected to the middle points of the secondaries 4 and 5, it will have a potential which is neutral with respect to the electromotive forces acting about the armature-winding 7, and therefore neutral with respect to the electromotive force impressed on the direct-current mains 20 and 21, which derive current from said winding. Such a neutral conductor is shown at 25 and extends from the middle point in the length of the inductance-coil 24 and coöperates with the direct-current mains 20 and 21 to produce a three-wire direct-current system.

To render clear the mode of operation of the apparatus as a whole, let it be supposed that the rotary converter be supplied with alternating current through the leads or supply-mains 15 to 18, inclusive, and that for convenience the current is in phase with the electromotive force. The field structure being excited in the usual manner by means of direct current derived from the mains 20 and 21 or otherwise a synchronous rotation of the converter-armature takes place, while the alternating currents flowing into the armature through both circuits between the two sets of taps 8 10 and 9 11, respectively, being in phase with each other will simultaneously change in value, reaching a maximum when the polar lines of the circuits mentioned lie across the field at right angles to the direction of the poles and passing through intermediate values as the armature progressively shifts in position. Since the direct current flowing out of the converter is constant throughout a revolution while the alternating current passes through a complete cycle, it follows that the resultant current in each armature-conductor lying within either of the circuits between the respective sets of taps 8 10 and 9 11 varies as the conductor changes from position to position, the range of variation, as in the ordinary rotary converter, being least in conductors situated midway between the taps and greatest at and near the points of connection of these taps. As to the armature-conductors lying between taps of the same polarity—as, for instance, between the taps 8 9—the conditions are different. The alternating electromotive forces impressed on the two sets of taps, respectively, being of the same value and in the same phase, are therefore equal to each other at every instant, from which it follows that no difference of potential due thereto exists between taps of corresponding polarity, so that no current directly due to the alternating electromotive forces will flow in the armature-conductors between these taps. The only current flowing in these conductors will therefore be the direct current which traverses the direct-current mains of the machine, and since this current is divided in passing through the armature the current which flows in the conductors mentioned is uniform and equal in value to one-half of that flowing through the commutator-brushes connected to the direct-current mains. Referring to the drawings, it will be seen that the current in the armature-conductors between the taps 8 9 and also between the taps 10 11 will be uniform and equal to one-half that in the direct-current mains. With multipolar machines the value of current is of course correspondingly changed, as will be obvious.

In conductors midway between taps of opposite polarity the wave of alternating current is opposed in phase to the rectangular wave of direct current, so that when the alternating wave is at its zero-point the full direct current flows. When the two currents become equal to each other, the resultant is zero, while at maximum alternating current the resultant is the excess of alternating over direct. This excess in the ordinary single-circuit rotary converter is equal in value to the direct current and in the double-circuit converter, herein disclosed, somewhat greater than the direct current, since in the latter machine the alternating electromotive force is less and the alternating current therefore greater than in the former.

In conductors at or near the taps for the alternating leads the conditions are different, since the maximum current flows in these conductors when the taps are nearer to the commutator-brushes. In such coils the rectangular wave of direct current is displaced from the alternating wave, the displacement being such that in the ordinary single-circuit converter the maximum alternating current occurs at the instant the direct current reverses, while in the double-circuit converter it occurs when the commutator-brushes are in connection with points between taps of the same polarity—for example, taps 8 9—and therefore at points in the alternating wave displaced from the maximum by an angle represented by a portion of the angle between the connections of the taps. As an alternating-current tap passes under a commutator-brush the direct current reverses, so that when the tap is on one side of the brush the alternating and direct currents in a conductor connected to the tap are added, while on the other side they are subtracted. The result is that the maximum current in conductors at or near the taps is the greater the less the phase displacement between the time of maximum alternating current and the instant of reversal of the direct current.

In the single-circuit converter the direct current reverses as the taps pass under the commutator-brushes, and therefore at a time when the alternating current is a maximum, while in the double-circuit converter the taps pass under the commutator-brushes and the reversal takes place at a time when the alternating current is considerably below its maximum value.

In the double-circuit converter the maximum resultant current in conductors at and near the taps is so much smaller compared with the single-circuit converter that it more than compensates for the increased heating of conductors in the region midway between the leads. The double-circuit converter therefore possesses the valuable advantage of increased capacity due to decreased heating and at the same time of a reduction in the excessive heating in and near the taps characteristic of rotary converters, and particularly those of the single-phase type The angular displacement of the taps is somewhat a matter of compromise, and within limits the heating in conductors situated between but nearest to taps of opposite polarity is reduced as the arc between the taps is decreased, while the heating of conductors farthest from the taps is increased. Provided the arc is not too great, the result of feeding currents of the same phase into or out of the armature-winding at points separated from each other results in rendering heating of the conductors considerably less unequal than is the case in the ordinary single-phase rotary converter now in use and at the same time reduces the mean heating, and so increases the capacity of the machine. With an arc of separation of the taps into the armature-winding of one-sixth of the polar pitch, as represented in Fig. 1 of the drawings, the heating of the conductors at these taps is approximately one-third less than the heating in the ordinary single-phase rotary converter, while the mean heating of all the conductors, taken together, is approximately fifteen per cent. less, the difference between the percentages in reduction of heating given being made up for by increase in heating in conductors situated between the taps of the armature-winding. As stated, however, the mean heating is reduced, because the decrease of heating at the taps preponderates over the increase in heating between the taps.

In addition to the decrease in armature-heating and the consequent increase in capacity of the machine there are certain other advantages which flow from the use of my invention.

In the ordinary single-circuit single-phase rotary converter the direct-current armature reaction does not vary except as the current varies, while that due to the energy component of the alternating current varies between zero and a maximum equal to twice that of the direct current. Since the armature reactions due, respectively, to the direct current and alternating current are in opposition to each other, the result is an oscillating reaction varying between a maximum in one direction equal in value to the direct-current reaction and an equal value in the opposite direction. The sweeping of lines of force back and forth through the pole-faces of the field-magnets due to this oscillating reaction gives rise to eddy-currents and similar losses and seriously interferes with proper commutation. By the use of my invention this oscillating reaction is considerably reduced, since the maximum resultant ampere-turns of the alternating current is decreased. The commutation is thus improved and losses due to eddy-currents, hysteresis, &c., decreased.

My invention is not limited to use in connection with single-phase machines, but is applicable to multiphase machines as well, Fig. 3 of the drawings for purposes of illustration showing the invention as applied to a two-phase rotary converter. The two-phase current is supplied over mains 28 to 31, inclusive, to two primaries 32 and 33. Each of these primaries is provided with two secondary windings, (indicated, respectively, at 34 35 and 36 37.)

The converter-armature is indicated at 38, and if a bipolar machine, such as indicated in the drawings, is tapped at eight points, separated from each other by equal angles in the instance shown. The two secondaries 34 and 35 are connected to the taps 39 40 and 41 42 in substantially the same manner as in Fig. 1, the two secondaries subtending arcs corresponding to the chords 43 44 in the explanatory diagram Fig. 4. The secondaries 36 and 37 are similarly connected to taps 45 46 and 47 48, the points of connection corresponding to parallel chords 49 50 at right angles to the parallel chords 43 44, as shown in Fig. 4. The rotary-converter armature is provided in the ordinary manner with a commutator 51, upon which bear brushes connected to direct-current mains 52 53, leading to a direct-current distribution system. (Not shown.) In Fig. 3 pole-pieces corresponding to a bipolar construction are shown; but it will be understood that both in this figure and in Fig. 1 the number of poles is unimportant so far as the invention is concerned, and the machine may be either bipolar or multipolar.

The arrangement shown in Fig. 3 is similar in its action to that in Fig. 1, in that the heating in the conductors adjacent to the taps or leads of the armature is less, and the mean heating of the conductors as a whole is less than in the ordinary construction of two-phase rotary converters in which current of a given phase is fed into the armature at two points only for each pair of poles. Since in a multiphase rotary converter the armature reaction of the alternating current balances that of the direct current, there is in this case of course no change in that respect. There is, however, the advantage that the local variations of magnetomotive force about the armature are considerably reduced, thus reducing losses due to eddy-currents, hysteresis, &c.

It is of course to be understood that the applications of my invention to rotary converters above described are valuable irrespective of whether alternating current is changed to direct or the reverse, so that my claims are not to be construed as necessarily limited to use in one of these relations only. Moreover, although I have illustrated my invention in connection with a single-phase rotary converter and a two-phase rotary converter it is of course to be understood that it is in no sense limited to use in the particular relations shown, but is much more extended in its application, and I therefore wish my claims to the invention to be considered accordingly.

What I claim as new, and desire to secure by Letters Patent of the United States, is—

1. A rotary converter having a plurality of separate alternating-current leads of like polarity connected to different points in the armature-winding of said rotary converter.

2. A single-phase rotary converter having a plurality of alternating-current leads transmitting currents of the same phase and connected to different points in the armature-winding of said rotary converter.

3. A rotary converter having a plurality of separate alternating-current circuits of the same phase, each circuit connected to points in the winding of said rotary converter different from the points of connection of the other circuit or circuits.

4. A single-phase rotary converter having a single armature-winding, a commutator for conveying direct current to or from said winding, and alternating-current leads connected to said winding so that the electromotive force of the direct current is higher than the maximum electromotive force of the alternating current.

5. A rotary converter having an armature-winding, a commutator connected to said winding, and alternating-current leads connected to said winding in such relation that the electromotive force of the direct current is higher than the maximum electromotive force of the alternating current.

6. A dynamo-electric machine provided with an armature and a commutator therefor, direct-current leads extending from the commutator, and pairs of alternating-current leads connected to fixed points in the armature-winding so as to convey alternating currents of the same phase, the points of connection of leads of the same polarity being adjacent to each other whereby armature-conductors lying between said adjacent points of connection carry only direct current while other armature-conductors carry a combination of alternating and direct current.

7. A dynamo-electric machine having a winding, and sets of coöperating terminals connected to certain fixed points of said winding corresponding to the ends of parallel chords.

8. A rotary converter having a winding, and sets of coöperating terminals connected to certain fixed points of said winding corresponding to the ends of parallel chords.

9. A single-phase rotary converter having a winding, and sets of coöperating terminals connected to certain fixed points of said winding corresponding to the ends of parallel chords.

10. A dynamo-electric machine having a winding, terminals in fixed electrical connection to points in said winding corresponding to the ends of parallel chords, and a plurality of leads connected to said terminals and carrying currents of the same phase.

11. A single-phase, alternating-current dynamo-electric machine having a winding, and circuits connected to fixed points in the winding having a difference of potential less than the maximum existing in said winding.

12. The combination of a dynamo-electric machine and a plurality of separate sets of leads carrying currents of the same phase and in fixed electrical connection with a winding of said machine, the points of connection of one set of leads being separate from the points of connection of another of said sets of leads.

13. The combination of a dynamo-electric machine, a plurality of sets of leads carrying currents of the same phase, connections between one set of leads and certain points in a winding on said machine, and separate connections between another set of leads and a different set of points in said winding.

14. The combination of a plurality of transformer-windings carrying currents of the same phase, a dynamo-electric machine provided with a winding, connections from fixed points in said winding to one of said transformer-windings, and separate connections from other fixed points in said winding to another of said transformer-windings.

15. The combination of a plurality of separate sources of alternating current of the same phase, a dynamo-electric machine provided with a winding, fixed electrical connections from certain points in said winding to one of said sources, and separate fixed electrical connections from other points in said winding to another of said sources.

16. The combination of a dynamo-electric machine, separate sources of current of the same phase, and connections to certain fixed points of the armature-winding of the machine for feeding said currents thereto.

17. The combination of a plurality of transformer-windings carrying currents of the same phase, a dynamo-electric machine provided with an armature-winding, connections from fixed points in said armature-winding to one of said transformer-windings, and other fixed connections from other points in said armature-winding to another of said transformer-windings.

18. The combination of a plurality of sources of alternating current of the same phase, a rotary converter, connections from one of said sources to certain fixed points in the armature-winding of said converter, and connections from another of said sources to other points in said winding.

19. The combination of a plurality of transformer-secondaries, means for generating therein electromotive forces of the same phase, a dynamo-electric machine provided with a winding, connections from fixed points in said winding to one of said secondaries, and other connections from certain other fixed points in said winding to another of said secondaries.

20. A rotary converter having a plurality of separate alternating-current circuits of the same phase, direct-current mains leading from the direct-current terminals of the machine, and a neutral conductor connected with a point of neutral potential on the alternating-current system and coöperating with said direct-current mains.

21. An alternating-current dynamo-electric machine connected through a plurality of separate circuits of the same phase to an alternating-current system, a direct-current system also connected to said dynamo-electric machine, and a conductor connected to a point of neutral potential on said alternating-current system and coöperating with the conductors of the direct-current system.

In witness whereof I have hereunto set my hand this 7th day of April, 1900.

CHARLES P. STEINMETZ.

Witnesses:
BENJAMIN B. HULL,
MABEL E. JACOBSON.